May 21, 1929.  E. T. LARKIN  1,713,541
LUBRICANT COOLING DEVICE FOR INTERNAL COMBUSTION ENGINES AND THE LIKE
Filed Jan. 12, 1928
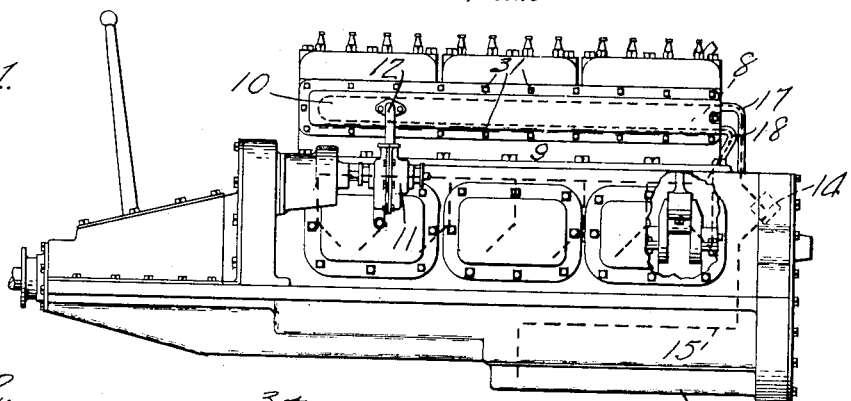
INVENTOR.
Elwood T. Larkin
by Parker & Prochnow
ATTORNEYS.

Patented May 21, 1929.

1,713,541

UNITED STATES PATENT OFFICE.

ELWOOD T. LARKIN, OF BUFFALO, NEW YORK, ASSIGNOR TO CHARLES A. CRIQUI, OF BUFFALO, NEW YORK.

LUBRICANT-COOLING DEVICE FOR INTERNAL-COMBUSTION ENGINES AND THE LIKE.

Application filed January 12, 1928. Serial No. 246,353.

This invention relates to devices for use in connection with the cooling of lubricants for engines or machines having fluid cooled cylinders. The invention is particularly applicable for use in connection with internal combustion engines in which an ample supply of cooling fluid at comparatively low temperatures is available.

The objects of this invention are to provide a lubricant cooling device of improved construction in which the lubricant is conducted through pipes or conduits which are subjected to the cooling medium before the same passes to the cylinders of the engine or machine; also to provide an improved construction by means of which lubricant cooling means may be embodied in an engine or machine at small expense; also to provide a device of this kind with means for efficiently distributing the cooling medium through the cylinders of an engine or machine after the same has been used to cool the lubricant; also to improve the construction of devices of this kind in other respects hereinafter specified.

In the accompanying drawings,

Fig. 1 is a side elevation of an internal combustion engine having my improved lubricant cooling means embodied therein.

Fig. 2 is a side elevation of the inner face of the side cover of the engine, showing the lubricant cooling pipe or conduit therein.

Fig. 3 is a transverse, sectional elevation thereof on line 3—3, Fig. 2.

Fig. 4 is a similar, transverse, sectional elevation thereof, showing a cooling device of modified construction.

The invention as illustrated by way of example in Fig. 1, is used in connection with a six cylinder internal combustion marine engine having the six cylinders cast en bloc. The cylinder casting of the engine is provided with an opening 8 in the outer wall 9 of the engine jacket, and this opening, in engines as heretofore built, is commonly closed by means of a side plate (not shown). However in accordance with my invention, this opening 8 is closed by a side cover 10 which is suitably bolted to the engine casting in the same manner as the side plate heretofore used. This side cover 10 is formed to house the lubricant cooling means. The engine shown is of a water cooled type, the cooling water being discharged by means of a pump 11 through a pipe 12 into the side cover 10, the pump 11 being suitably driven by the engine in the usual manner. The lubricant to be cooled may be circulated in any way, for example, by means of a pump 14, indicated diagrammatically in broken lines in Fig. 1, which takes the oil through a conduit 15, indicated in broken lines in Fig. 1, from the crank case 16 of the engine and then discharges the same into a conduit or pipe 17 to my improved cooling device. The lubricant after having been cooled passes through a conduit 18 to the various parts of the engine which are to be lubricated. My improved lubricant cooling device may, of course, be used in connection with engines or machines of other kinds, and other means for pumping the water or other cooling medium and for circulating the lubricant may be employed, if desired.

In accordance with my invention the lubricant passes from the conduit or pipe 17 to a pipe or coil 20 which may consist of a piece of tubing bent to form two parallel portions extending lengthwise of the engine in the side cover 10 of the engine, which is so formed as to receive the cooling coil 20. The ends of the coil may be connected with the pipes 17 and 18 in any suitable manner, for example by means of a pipe coupling 21, and bushings 22 may be employed for forming a watertight connection between the coil 20 and the end wall of the side cover 10 through which the ends of the pipe or coil 20 pass.

The cooling coil 20 may be supported within the side cover 10 of the engine in any suitable or desired manner. In the construction shown the coil rests against lugs or ribs 25 formed on the inner face of the side cover 10 against which the coil 20 is yieldingly pressed by the end portion of spring clamps or plates 26, which may be secured in any suitable manner, for example, by means of screws 27 engaging the middle portions of the plates 26 and thus pressing the ends of the plates against the cooling coil 20. The screws 27 preferably engage in lugs 28 or other parts mounted on or secured to the side cover 10. Preferably the ends of the plates 26 are bent or slightly curved as shown at 29 so as to assist in holding the cooling coil 20 in correct relation to the side cover.

The side cover 10 within which the cooling coil 20 is arranged may be secured to the engine in the usual manner, that shown being secured to the outer wall 9 of the engine frame or water jacket by the usual bolts 31, a gasket 32 being arranged between the side cover and the outer wall 9 of the water jacket of the engine, thus closing the opening 8 in the water jacketed portion of the engine. In many engines as now constructed this opening is closed by a side plate, and consequently when it is desired to apply my improved oil cooling device to an engine it is only necessary to remove the usual side plate and replace the same by the side cover 10 with the oil cooling coil arranged therein.

The recess or concavity of the cover plate constitutes an extension of the water jacket of the engine, and the water after being discharged by the pump 11 through the pipe 12 into the side cover 10, first cools the lubricant in the coil 20 and then passes to the water jacket of the engine. Preferably the recess or concavity in the side cover 10 of the engine is separated from the engine jacket by a partition or plate so that the cool incoming water does not become mixed with the warmer water in the engine jacket until after the cooling water is discharged from the cavity 25 in the side cover. This may be accomplished in any suitable or desired manner and in the particular construction shown a plate 35 is employed for this purpose which is secured to the side cover 10 in any suitable manner, for example, by means of screws 36 arranged at the ends of the plate. Communication between the cavity 25 in the side cover and the engine water jacket may be established in any suitable manner, for example, by cutting off the corners of the plate 35 as shown at 37, and, if desired, holes 38 may be provided at intervals in the plate to permit water to flow from the cavity 25 to the engine water jacket. It is desirable that the openings through which water passes from the cavity 25 to the engine water jacket be arranged in such a way as to afford a substantially even distribution of the water to all parts of the engine jacket, so that a uniform cooling of the engine results from the use of the distributing plate 35. Any other means for regulating the flow of cooling medium from the cavity 25 to the water jacket may be provided, if desired.

While only a single coil or pipe 20 is shown in Figs. 2 and 3, it will be obvious that if greater cooling capacity is necessary, this can readily be attained by increasing the number of coils. In order to accommodate the increased number of coils the depth of the cavity 25 in the side cover 10 may readily be increased by increasing the width of the side cover.

In Figs. 1 to 3 the invention has been illustrated as applied to an engine having an opening in the water jacket of the engine. The use of the invention is, however, not restricted to engines of this type. By way of illustration Fig. 4 shows the invention applied to an engine having no opening in the side of the water jacket and in which the cylinders 40 are formed independently of the engine block and are secured therein. 41 represents the circulating space for the cooling fluid formed within the engine block or casting 42. In order to provide the engine with an oil cooling device, the engine block or casting is provided with a laterally projecting portion 43 forming a cavity within which the cooling coil or coils 44 may be secured in any suitable or desired manner, for example, by means of spring clamps 45 secured to the projecting portion 43 of the engine casting by means of screws 46, and 47 represents a distributing plate which may be similar in construction to the plate 35 used in connection with the construction shown in Figs. 1–3. In an engine of this kind the coils 44 are secured in place before the cylinders 40 are assembled into the engine casting.

The lubricant cooling device described has the advantage that it is built into the engine itself and is protected from damage by parts of the engine. The cooling device is thoroughly efficient and can be produced at low cost. The construction shown in Figs. 1 to 3 has the further advantage that it can easily be applied to an engine having no oil cooling means.

I claim as my invention:—

1. The combination of a machine having a jacket for the circulation of a cooling fluid and provided with an enlargement at a portion thereof, a passage in said enlargement for the circulation of a lubricant, and means for conducting cooling fluid to said enlargement to cool said lubricant before passing to said jacket.

2. The combination of a machine having a jacket for the circulation of a cooling fluid and provided with an enlargement at a portion thereof, a passage in said enlargement for the circulation of a lubricant, means for conducting cooling fluid to said enlargement to cool said lubricant, and means for controlling the flow of cooling fluid from said enlargement to said jacket.

3. The combination of a machine having a jacket for the circulation of a cooling fluid and provided with an enlargement at a portion thereof, a passage in said enlargement for the circulation of a lubricant, means for conducting cooling fluid to said enlargement to cool said lubricant, and a distributing wall between said enlargement and said jacket to provide a substantially uniform distribution of cooling fluid from said enlargement to said jacket.

4. The combination of a machine having a jacket for the circulation of a cooling fluid and provided with an enlargement at a side thereof, a tube in said enlargement for the circulation of lubricant, means for securing said tube in said enlargement, and means for conducting cooling fluid to said enlargement before the same passes to said jackets.

5. The combination of a multicylinder internal combustion engine having a jacket about the cylinders for the circulation of a cooling fluid, said jacket having an enlargement on one side thereof, a tube for the circulation of the lubricant of said engine and arranged in said enlargement, and means for conducting cooling fluid first to said enlargement for cooling the lubricant and then to said jacket.

6. The combination of a multicylinder internal combustion engine having a jacket about the cylinders for the circulation of a cooling fluid, said jacket having an enlargement on one side thereof, a tube for the circulation of the lubricant of said engine and arranged in said enlargement, means for conducting cooling fluid to said enlargement and a distributing plate interposed between said enlargement and said engine jacket and providing openings for the distribution of cooling fluid from said enlargement to said jacket.

7. The combination of a multicylinder internal combustion engine having a jacket about the cylinders for the circulation of a cooling fluid and having an opening in the outer wall of said jacket, a side cover for said opening having a recess therein, a cooling pipe for the lubricant of said engine arranged in said recess, and means for conducting cooling fluid to said recess.

8. The combination of a multicylinder internal combustion engine having a jacket about the cylinders for the circulation of a cooling fluid and having an opening in the outer wall of said jacket, a side cover for said opening having a recess therein, a cooling pipe for the lubricant of said engine arranged in said recess, means for conducting cooling fluid to said recess, and means interposed between said recess and the engine jacket for distributing the flow of fluid from said recess to said engine jacket.

9. The combination of a multicylinder internal combustion engine having a jacket about the cylinders for the circulation of a cooling fluid and having an opening in the outer wall of said jacket, a side cover for said opening having a recess therein, a cooling pipe for the lubricant of said engine arranged in said recess, means for conducting cooling fluid to said recess, and a distributing plate secured to said side cover to separate the cooling fluid in said recess from the cooling fluid in said jacket and to permit the flow of cooling fluid from said recess to said jacket.

ELWOOD T. LARKIN.